(12) United States Patent
Roh

(10) Patent No.: US 8,836,612 B2
(45) Date of Patent: Sep. 16, 2014

(54) METHOD AND DEVICE FOR DRIVING A PLURALITY OF DISPLAY DEVICES

(75) Inventor: Jong Ho Roh, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1144 days.

(21) Appl. No.: 12/783,875

(22) Filed: May 20, 2010

(65) Prior Publication Data

US 2010/0309237 A1     Dec. 9, 2010

(30) Foreign Application Priority Data

Jun. 9, 2009   (KR) ...................... 10-2009-0050771

(51) Int. Cl.
G09G 3/36 (2006.01)
G06F 3/14 (2006.01)
G09G 5/18 (2006.01)

(52) U.S. Cl.
CPC ............ G06F 3/1431 (2013.01); *G06F 3/1446* (2013.01); *G09G 5/18* (2013.01); *G09G 3/3611* (2013.01)
USPC .............................................. 345/1.3; 345/87

(58) Field of Classification Search
USPC ................... 345/1.1, 1.3, 88, 204, 690, 87
See application file for complete search history.

(56) References Cited

U.S. PATENT DOCUMENTS

| | | | | |
|---|---|---|---|---|
| 7,940,241 | B2 * | 5/2011 | Bae et al. | 345/98 |
| 2004/0222941 | A1 | 11/2004 | Wong et al. | |
| 2004/0222943 | A1 * | 11/2004 | Kudo et al. | 345/1.1 |
| 2005/0162336 | A1 | 7/2005 | McClintock et al. | |
| 2006/0087477 | A1 | 4/2006 | Kang et al. | |
| 2006/0290641 | A1 * | 12/2006 | Ku et al. | 345/98 |
| 2008/0055466 | A1 * | 3/2008 | Garg et al. | 348/452 |
| 2008/0122735 | A1 | 5/2008 | Park et al. | |
| 2008/0259099 | A1 * | 10/2008 | Arai et al. | 345/690 |
| 2009/0040297 | A1 | 2/2009 | Harada et al. | |

FOREIGN PATENT DOCUMENTS

| | | |
|---|---|---|
| JP | 08-304774 | 11/1996 |
| JP | 09-062230 | 7/1997 |
| JP | 2003-015622 | 1/2003 |
| JP | 2007-298769 | 11/2007 |

* cited by examiner

*Primary Examiner* — Pegeman Karimi

(74) *Attorney, Agent, or Firm* — Volentine & Whitt, PLLC

(57) ABSTRACT

A device includes a plurality of display modules configured to commonly receive a stream of video data from a controller and a video control masking unit. Each display module includes a display device. The video control masking unit receives one or more control signals that indicate how the video data is to be displayed by the display modules, and further receives at least one of: a clock signal for clocking the stream of video data that is provided in common to the plurality of display modules, and a data enable signal for enabling the display modules to process the video data; and in response thereto the video control masking unit masks at least one of the clock signal and the data enable signal to generate a plurality of masked signals each corresponding to one of the display modules, and provides each of the masked signals to the corresponding display module.

17 Claims, 15 Drawing Sheets

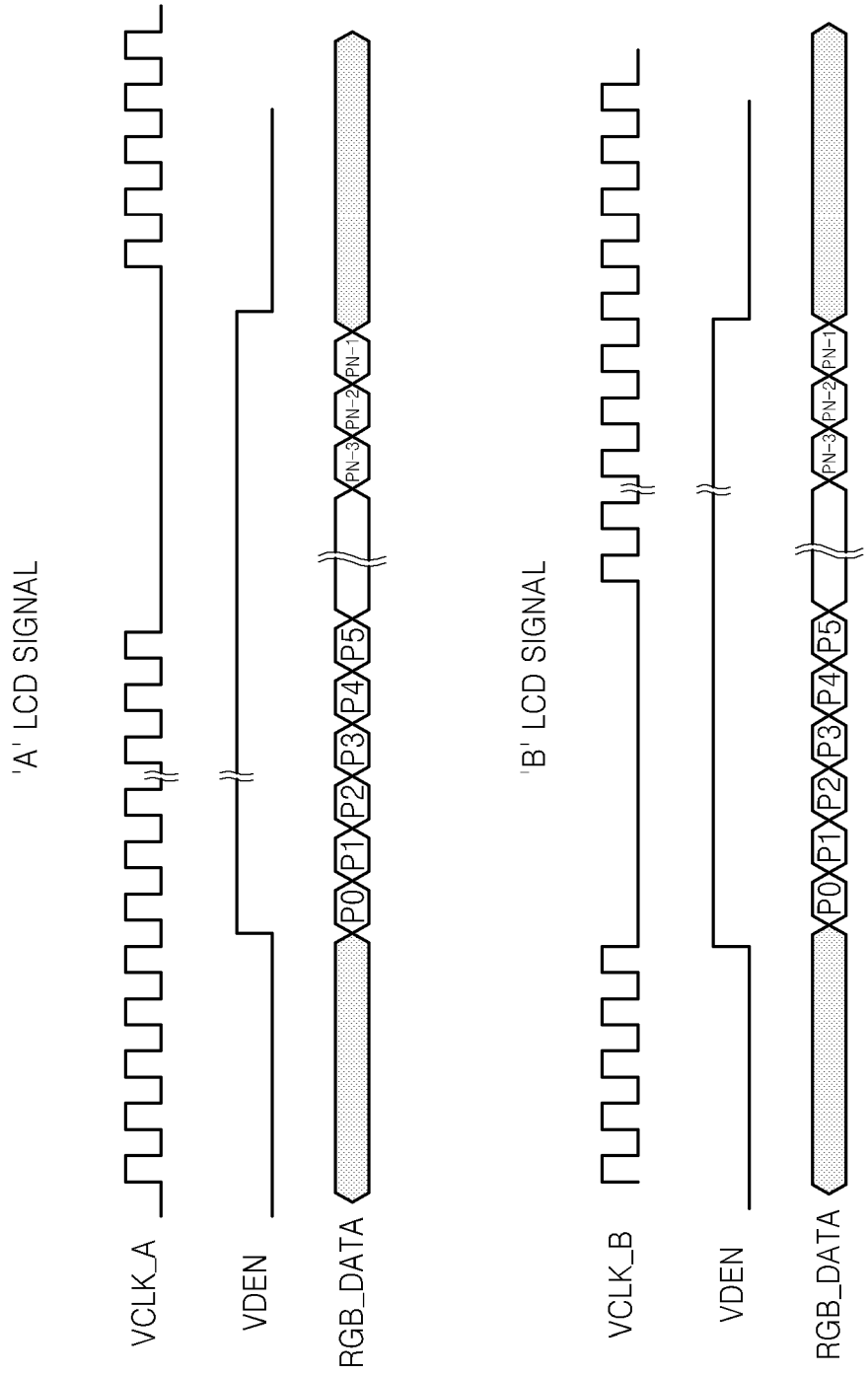

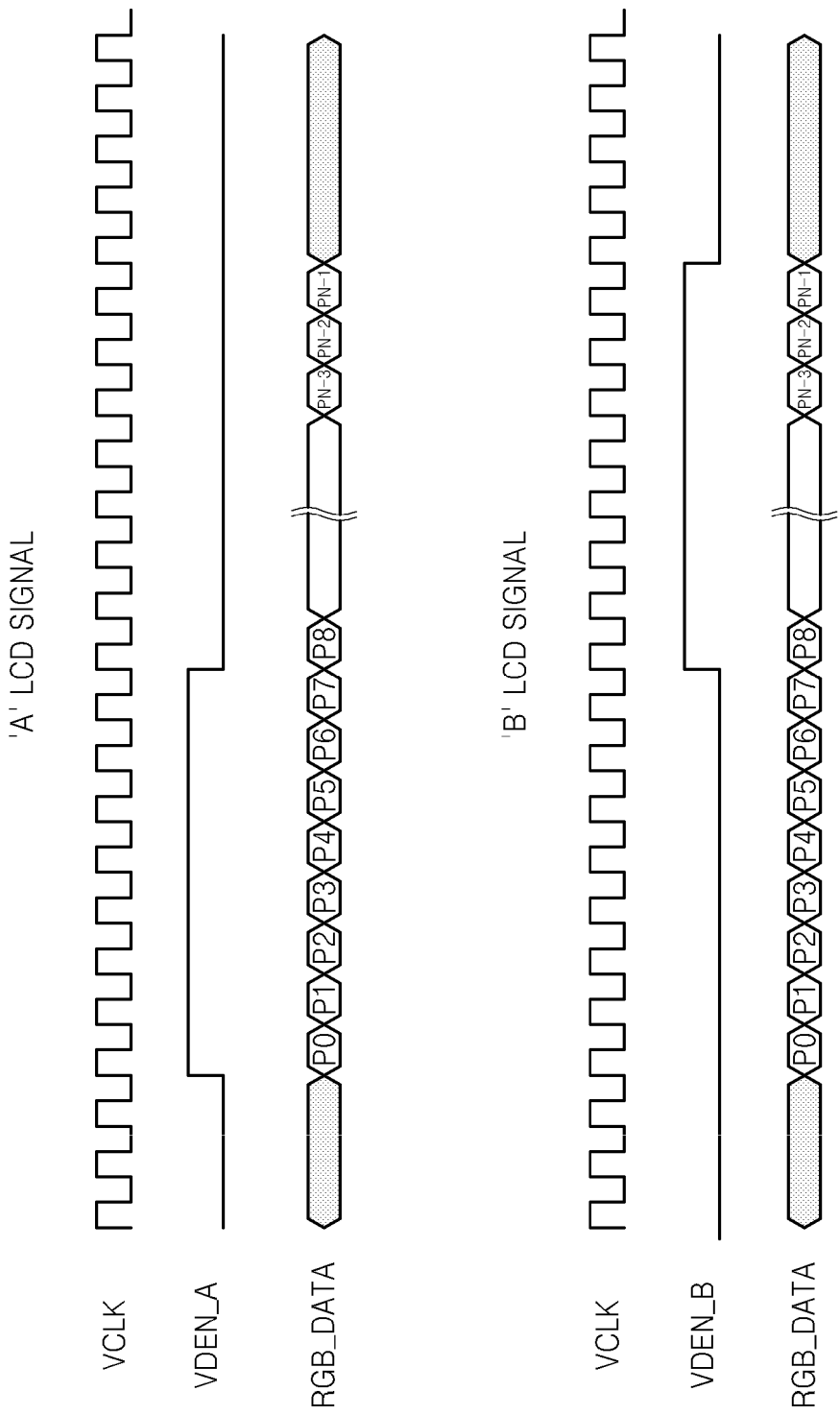

METHOD AND DEVICE FOR DRIVING A PLURALITY OF DISPLAY DEVICES

CROSS-REFERENCE TO RELATED APPLICATION

This application claims priority under 35 U.S.C. §119 from Korean Patent Application 10-2009-0050771, filed on 9 Jun. 2009 in the name of Jong Ho Roh, the entirety of which is hereby incorporated by reference for all purposes as if fully set forth herein.

BACKGROUND

1. Field

This disclosure pertains to the field of image display, and more particularly, to a method and device for driving a plurality of display devices, and in various embodiments, a method and device for driving a plurality of display devices (e.g., liquid crystal display (LCD) devices) to display a combined image.

2. Description

Among display devices, liquid crystal display devices (LCD) devices are popular for a variety of applications, including in particular portable or mobile devices such as mobile telephones or other communication devices, portable computing devices, etc. In general, a liquid crystal display (LCD) panel includes a pair of substrates provided with pixel electrodes and a common electrode, and a liquid crystal layer with dielectric anisotropy interposed between the substrates. The liquid crystal display device controls the transmittance of light passing through the liquid crystal layer by applying an electric field to the liquid crystal layer and adjusting the field strength for displaying desired images.

FIG. 1 illustrates an arrangement 100 for displaying image data via a display device such as an LCD device. The arrangement 100 of FIG. 1 includes an application processor 110 and an LCD module 120. Application processor 110 includes an LCD control 115 providing video signals to LCD module 120. In arrangement 100, the video signals include a video clock signal VCLK, a vertical sync signal VSYNC, a horizontal sync signal HSYNC, a video data enable signal VDEN, and RGB data including eight signals for red R(7:0), eight signals for green G(7:0), and eight signals for blue B(7:0) to provide eight bits for each color. In other embodiments, the RGB data may be arranged differently, for example, a different number of bits for each color, a different number of colors, and/or a different selection of colors. LCD module 120 includes a timing controller 121, a gate (or row) driver 122, a source (or column) driver 123, an LCD panel 124, a back light 125 and a power supply 126.

FIG. 2 shows a functional block diagram of a system 200 for displaying image data via a display device such as an LCD device. System 200 includes a system-on-a-chip (SOC) 210, an LCD module 220 and system memory 230.

In some embodiments, LCD module 220 may be arranged the same as LCD module 120 of FIG. 1.

A system-on-a-chip or SOC refers to a device that integrates all or almost all components of a particular electronic system into a single integrated circuit (chip). It may contain digital, analog, mixed-signal, software, and even radio-frequency functions—all on a single chip substrate. A typical application is in the area of embedded systems.

SOC 210 includes a memory controller 211, a processor (e.g., a general purpose microprocessor, special-purpose processor, digital signal processor, etc.) 212, a clock control block 213, a video port processor 214, and an LCD controller 215 all connected to a common system bus 216. Clock control block 213 may include one or more oscillators, phase-lock loops, etc. for generating one or more clocks or timing signals.

FIG. 3 shows a timing diagram for video signals employed in the system illustrated in FIGS. 1 and 2. The video signals include a vertical sync signal VSYNC, a horizontal sync signal HSYNC, a video data enable signal VDEN, and RGB data RGB_DATA. The top portion of FIG. 3 illustrates one video frame period from one VSYNC pulse to the next VSYNC pulse. The bottom portion of FIG. 3 shows an "exploded view" of one line period within the video frame period, where a line period extends from one HSYNC pulse to the next HSYNC pulse. It should be understood that while FIG. 3 illustrates one signal for RBG_DATA, in practice this represents many parallel signals (e.g., 8 bits/color*3 colors=24 signals in parallel).

As shown in FIG. 3, each video frame period includes an active frame period VACT corresponding to lines of valid RGB data to be displayed by the LCD device. Each video frame period also includes a vertical sync interval (VS), a back porch period (VB), and a front porch period (VF), during each of which periods the video data enable signal VDEN is deactivated or LOW so that no RGB data is displayed by the LCD device. As also shown in FIG. 3, each line period includes an active line period HACT corresponding to valid RGB data to be displayed by the LCD device. The video data enable signal VDEN is enabled (active-HIGH) coincidental with valid RGB data within each active line period HACT so that the valid RGB data is displayed by the LCD device. As also shown in FIG. 3, each line period also includes a horizontal sync interval (HS), a horizontal blanking period (HB), and a horizontal blanking period (HF), during each of which periods the video data enable signal VDEN is deactivated or LOW so that no video data signal is displayed by the LCD device.

In some applications, it is desired or necessary to split image data between two or more display devices. More specifically, in some cases it is desired to split a particular image (including, for example a moving image or video) into two or more portions that are displayed on two or more corresponding LCD devices. For example, it may be desired to display an image with a larger display size than can be practically realized with a single LCD panel.

Unfortunately, this can present some problems since the video data distribution to the plural PCD devices needs to be coordinated and properly timed. If an SOC includes multiple display controllers to control multiple LCD devices, then this increases the chip area that is consumed with the video controlling functionality. Furthermore, as shown above, each LCD module needs to receive a relatively large number of video data and timing signals, and if there are multiple video controllers, then this increases the number of output pins required for the SOC.

Accordingly, it would be desirable to provide a new method and device for driving a plurality of display devices (e.g., LCD devices) that can address one or more of these shortcomings.

SUMMARY

The present disclosure is directed to a method and system for displaying image data via a plurality of liquid crystal display (LCD) devices.

In one aspect of the inventive concept, a method is provided for driving a plurality of liquid crystal display (LCD) modules each including an LCD device. The method comprises:

receiving at least one of: a clock signal for clocking a stream of video data that is provided in common to the plurality of LCD modules, and a data enable signal for enabling the LCD modules to process the video data; receiving one or more control signals that indicate how the video data is to be displayed by the plurality of LCD modules; masking at least one of the clock signal and the data enable signal to generate a plurality of masked signals each corresponding to one of the plurality of LCD modules; and providing each of the masked signals to the corresponding LCD module.

In another aspect of the inventive concept, a device comprises: a display controller configured to output: a stream of video data that is provided in common to a plurality of display modules, each display module including a display device; and a video control masking unit, configured to receive one or more control signals that indicate how the video data is to be displayed by the plurality of display modules, and to receive at least one of: a clock signal for clocking the video data, and a data enable signal for enabling the display modules to process the video data, and in response thereto to mask at least one of the clock signal and the data enable signal to generate a plurality of masked signals each corresponding to one of the plurality of display modules and to provide each of the masked signals to the corresponding display module.

In yet another aspect of the inventive concept a device comprises: a plurality of display modules configured to commonly receive from a controller a stream of video data, each of the display modules including a display device; and a video control masking unit, configured to receive one or more control signals that indicate how the video data is to be displayed by the plurality of display modules, and further to receive at least one of: a clock signal for clocking the stream of video data that is provided in common to the plurality of display modules, and a data enable signal for enabling the display modules to process the video data; and in response thereto to mask at least one of the clock signal and the data enable signal to generate a plurality of masked signals each corresponding to one of the plurality of display modules, and to provide each of the masked signals to the corresponding display module.

In still another aspect of the inventive concept, a device comprises: a plurality of display drivers for driving a plurality of display modules, each display module including a display device, the plurality of display drivers being configured to commonly receive from a controller a stream of video data; and a video control masking unit, configured to receive one or more control signals that indicate how the video data is to be displayed by the plurality of display devices, and further to receive at least one of: a clock signal for clocking the stream of video data, and a data enable signal for enabling the display drivers to process the video data; and in response thereto to mask at least one of the clock signal and the data enable signal to generate a plurality of masked signals each corresponding to one of the plurality of display drivers, and to provide each of the masked signals to the corresponding display driver.

BRIEF DESCRIPTION OF THE DRAWINGS

FIG. 7 shows an example of a timing diagram for signals employed in displaying image data on two display devices wherein each line of the image is split between two display devices.

FIG. 8 shows another example of a timing diagram for signals employed in displaying image data on two display devices wherein each line of the image is split between two display devices.

DETAILED DESCRIPTION OF THE EMBODIMENTS

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 4:
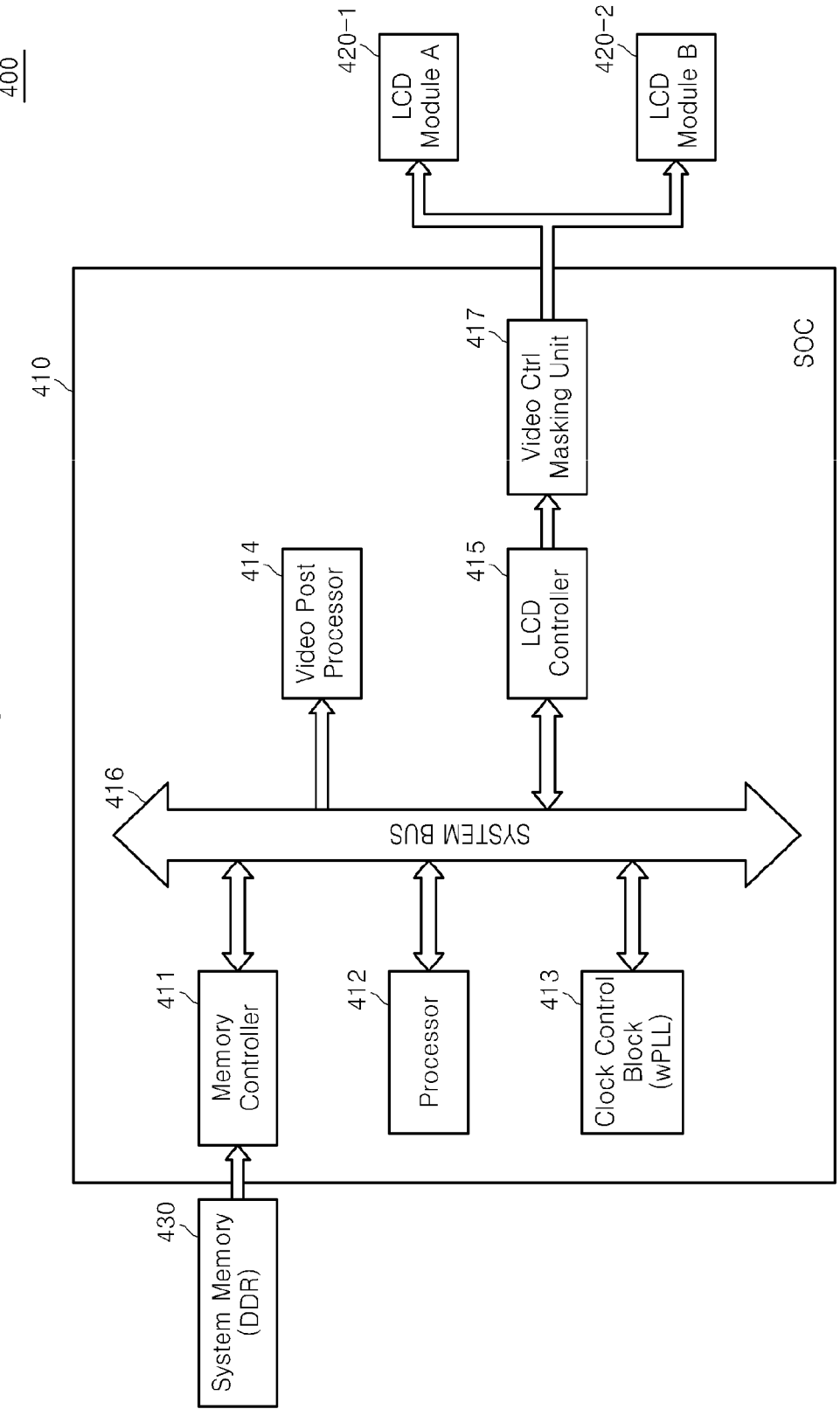
FIG. 4 shows a functional block diagram of one embodiment of a system for displaying image data via a plurality of display devices.

FIG. 4 shows a functional block diagram of one embodiment of a system 400 for displaying image data (e.g., video data) via a plurality of display devices, for example liquid crystal display (LCD) modules each including an LCD device. System 400 includes a system-on-a-chip (SOC) 410, first and second LCD modules 420-1 and 420-2, and system memory 430.

Figure 1:
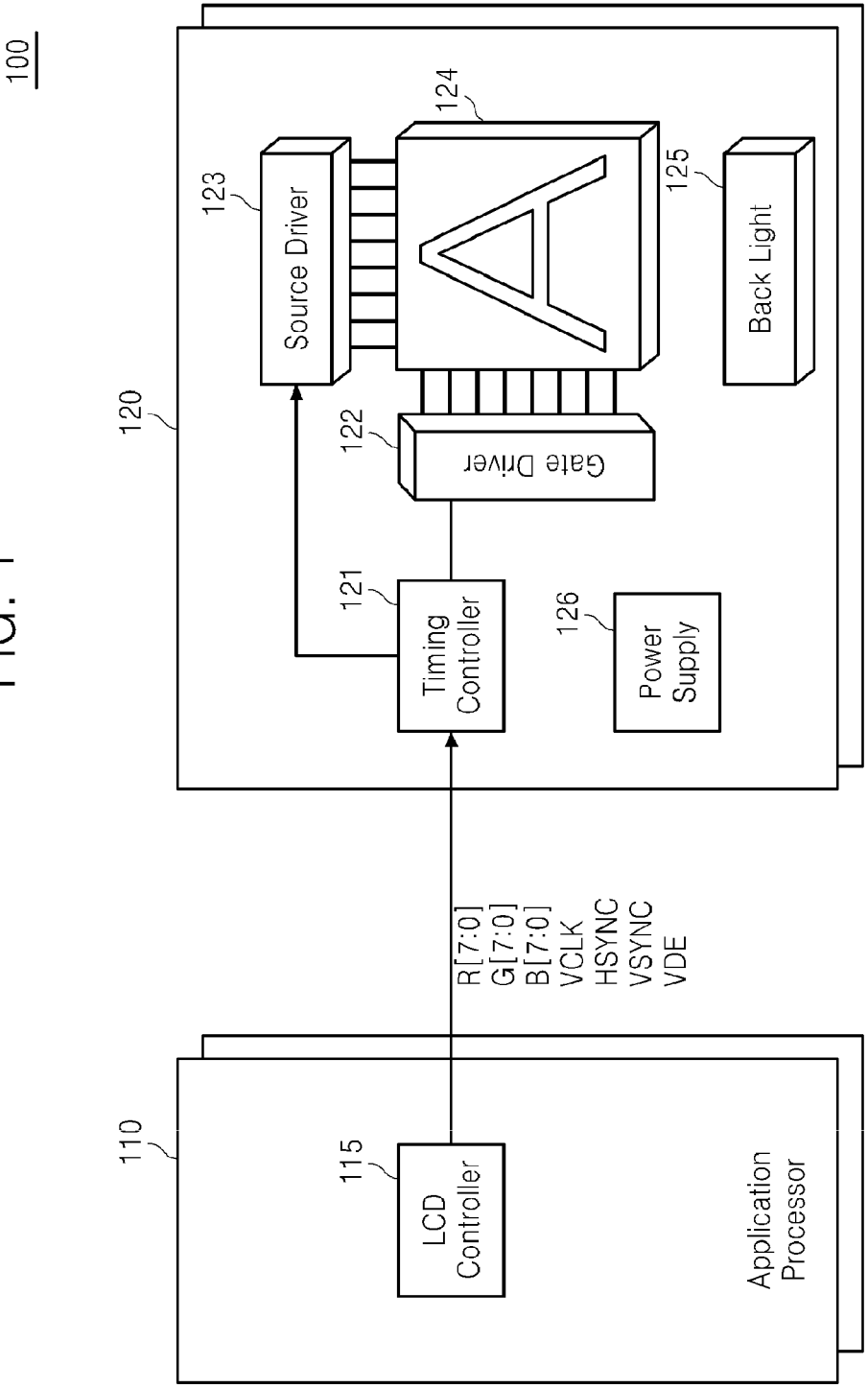
FIG. 1 illustrates an arrangement for displaying image data via a liquid crystal display (LCD) device.
Figure 2:
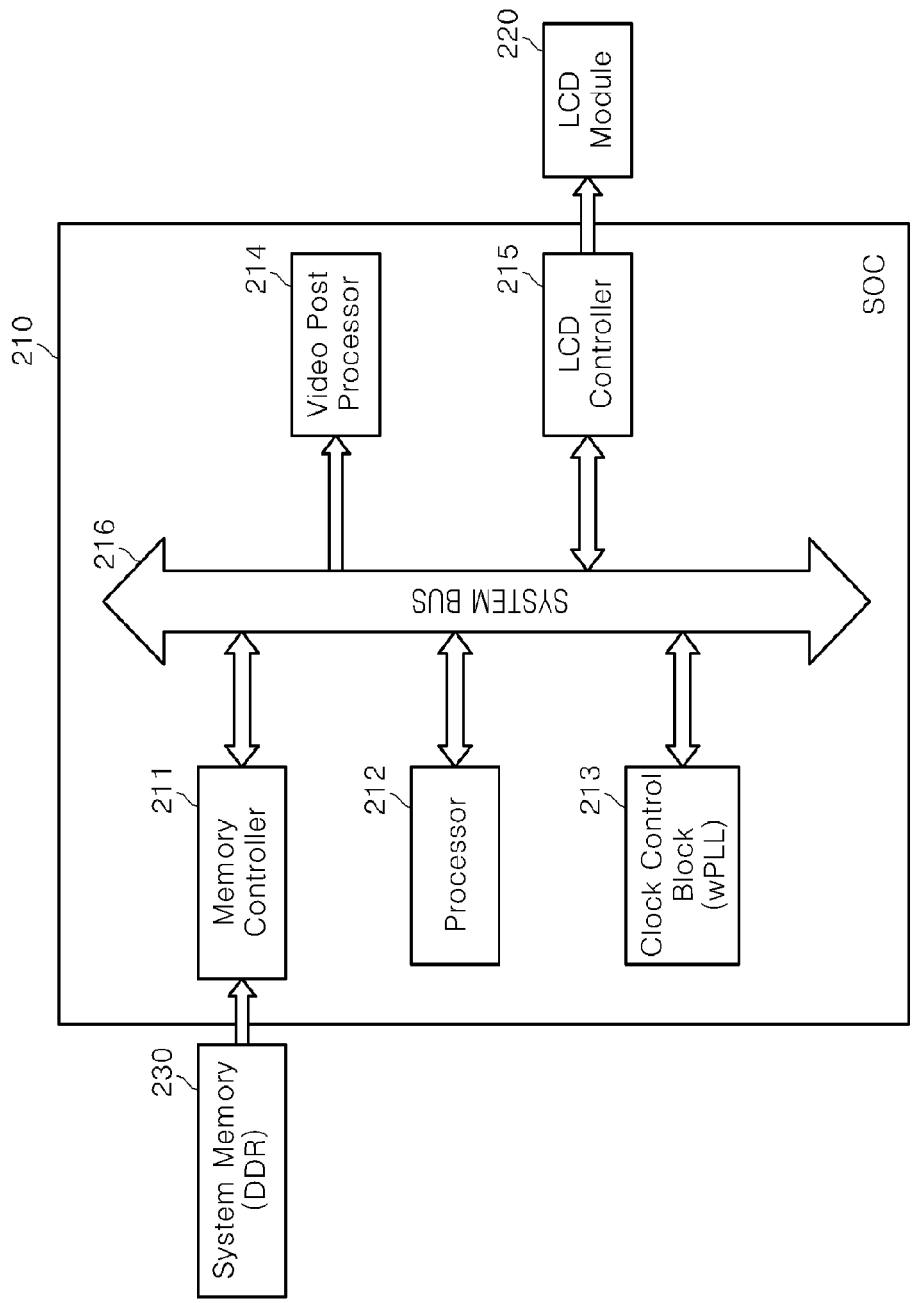
FIG. 2 shows a functional block diagram of a system for displaying image data via a liquid crystal display (LCD) device.
Figure 3:
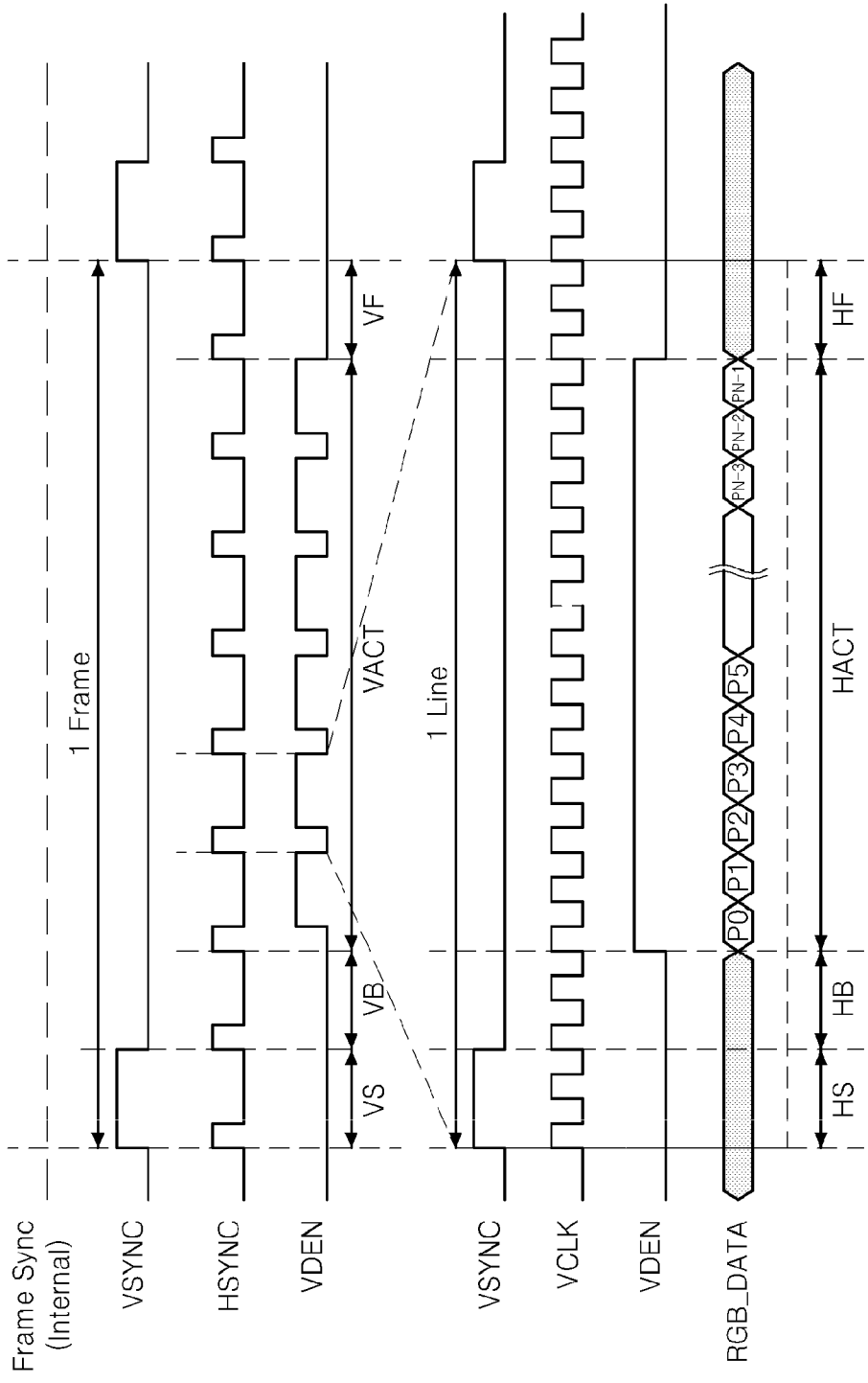
FIG. 3 shows a timing diagram for signals employed in the system illustrated in FIG. 2.

In some embodiments, LCD modules 420-1 and 420-2 each may be arranged the same as LCD module 120 of FIG. 1.

SOC 410 includes a memory controller 411, a processor (e.g., a general purpose microprocessor, special-purpose processor, digital signal processor, etc.) 412, a clock control block 413, a video port processor 414, and an LCD controller 415 all connected to a common system bus 416, and a video control masking unit 417 connected to LCD controller 415.

Clock control block 413 may include one or more oscillators, phase-lock loops, etc. for generating one or more clocks or timing signals.

Beneficially system 400 displays an image (including, for example a moving image or video) such that it is split between first and second LCD modules 420-1 and 420-2 using a single LCD controller 415. It should be understood that in other embodiments, the system may split an image (including, for example a moving image or video) between more than two LCD modules. In still other embodiments, system 400 may generate RGB data by mixing image data from at least two independent images stored in memory, such as system memory 430. In such embodiments, SOC 410 may include a plurality of direct memory access ports configured to provide to a mixer the video data from the at least two independent images stored in memory.

In contrast to a SOC which employs multiple LCD controllers, in some embodiments SOC 410 is able to interface with a plurality of LCD modules, and thereby drive a plurality of LCD devices, without duplicating all of the signals—and output pins—that are employed for driving a single LCD module. Further details of this benefit will be explained below. Furthermore, in some embodiments the single LCD controller 415 requires less chip space in SOC 410 than if two complete LCD controllers were required for driving the two LCD modules 420-1 and 420-2. These features can be especially important in the case of an SOC which is employed in a small, portable or mobile device.

Figure 5:
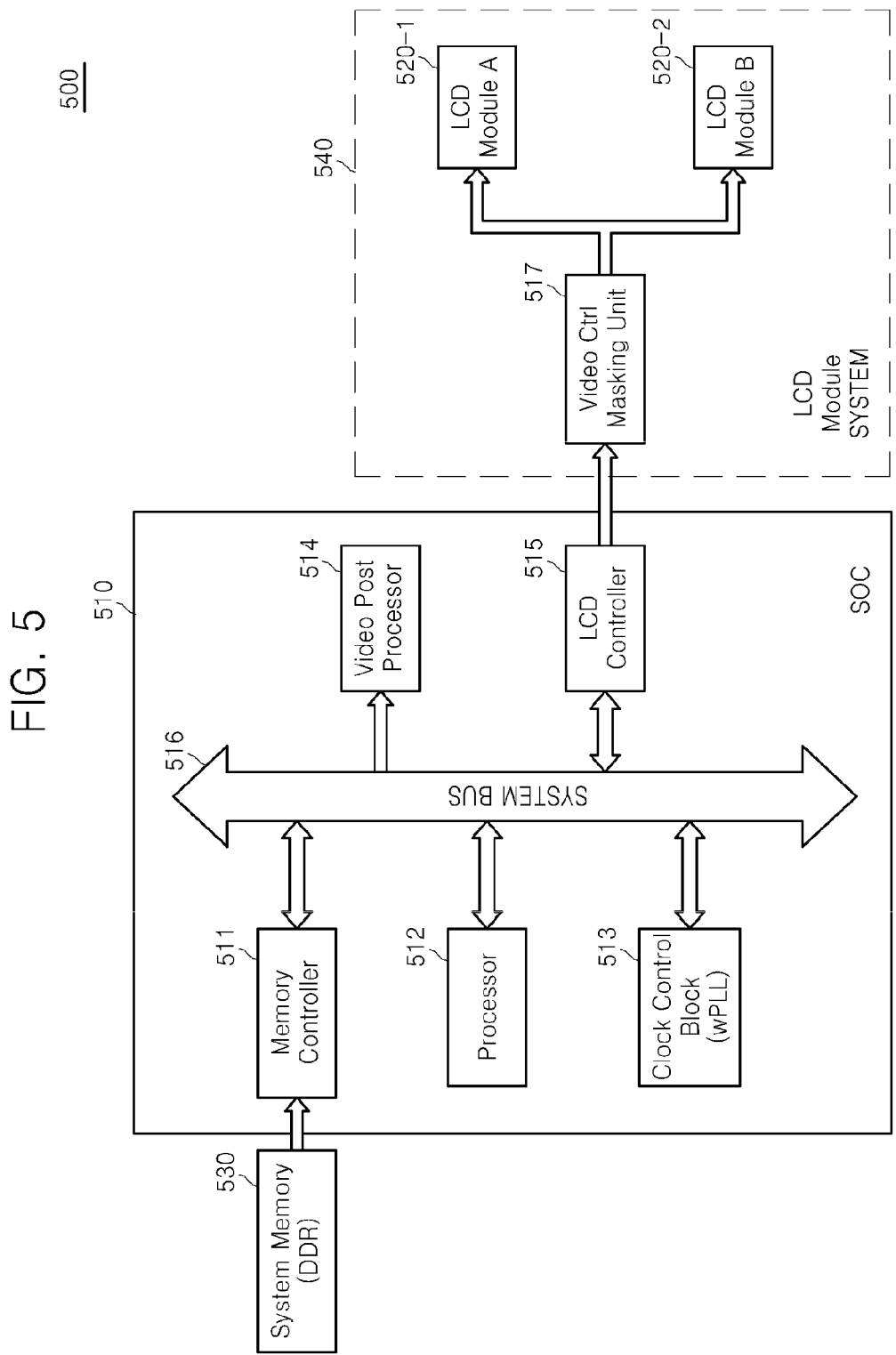
FIG. 5 shows a functional block diagram of another embodiment of a system for displaying image data via a plurality of display devices.

FIG. 5 shows a functional block diagram of another embodiment of a system 500 for displaying image data (e.g., video data) via a plurality of display devices (e.g., LCD modules). System 500 includes a system-on-a-chip (SOC) 510, system memory 530, and an LCD module system 540.

SOC 510 includes a memory controller 511, a processor (e.g., a general purpose microprocessor, special-purpose processor, digital signal processor, etc.) 512, a clock control block 513, a video port processor 514, and an LCD controller 515 all connected to a common system bus 516. Clock control block 513 may include one or more oscillators, phase-lock loops, etc. for generating one or more clocks or timing signals.

LCD module system 540 includes a video control masking unit 517 and first and second LCD modules 520-1 and 520-2. In some embodiments, LCD modules 520-1 and 520-2 each may be arranged the same as LCD module 120 of FIG. 1. Video masking unit receives the video signals from LCD controller 515 (e.g., the signals shown in FIG. 1) and conditions those signals to divide the image data (including, for example, video data) between the two LCD modules 520-1 and 520-2.

Beneficially system 500 displays an image (including, for example a moving image or video) such that it is split between first and second LCD modules 520-1 and 520-2 using a single LCD controller 515. Video control masking unit 517 receives the video signals from LCD controller 515 and adapted them for driving a plurality of LCD modules. It should be understood that in other embodiments, the system may split an image (including, for example a moving image or video) between more than two LCD modules. In still other embodiments, system 500 may generate RGB data by mixing image data from at least two independent images stored in memory, such as system memory 430. In such embodiments, SOC 510 may include a plurality of direct memory access ports configured to provide to a mixer the video data from the at least two independent images stored in memory.

In contrast to system 200, in some embodiments system 500 is able to drive a plurality of LCD devices without burdening SOC 510 to duplicate all of the signals—and output pins—of that are employed for driving a single LCD device. Further details of this benefit will be explained below. Furthermore, in some embodiments the single LCD controller 515 requires less chip space in SOC 510 than if two complete LCD controllers were required for driving the two LCD modules 520-1 and 520-2. These features can be especially important in the case of a system which is employed in a small, portable or mobile device.

Figure 6A:
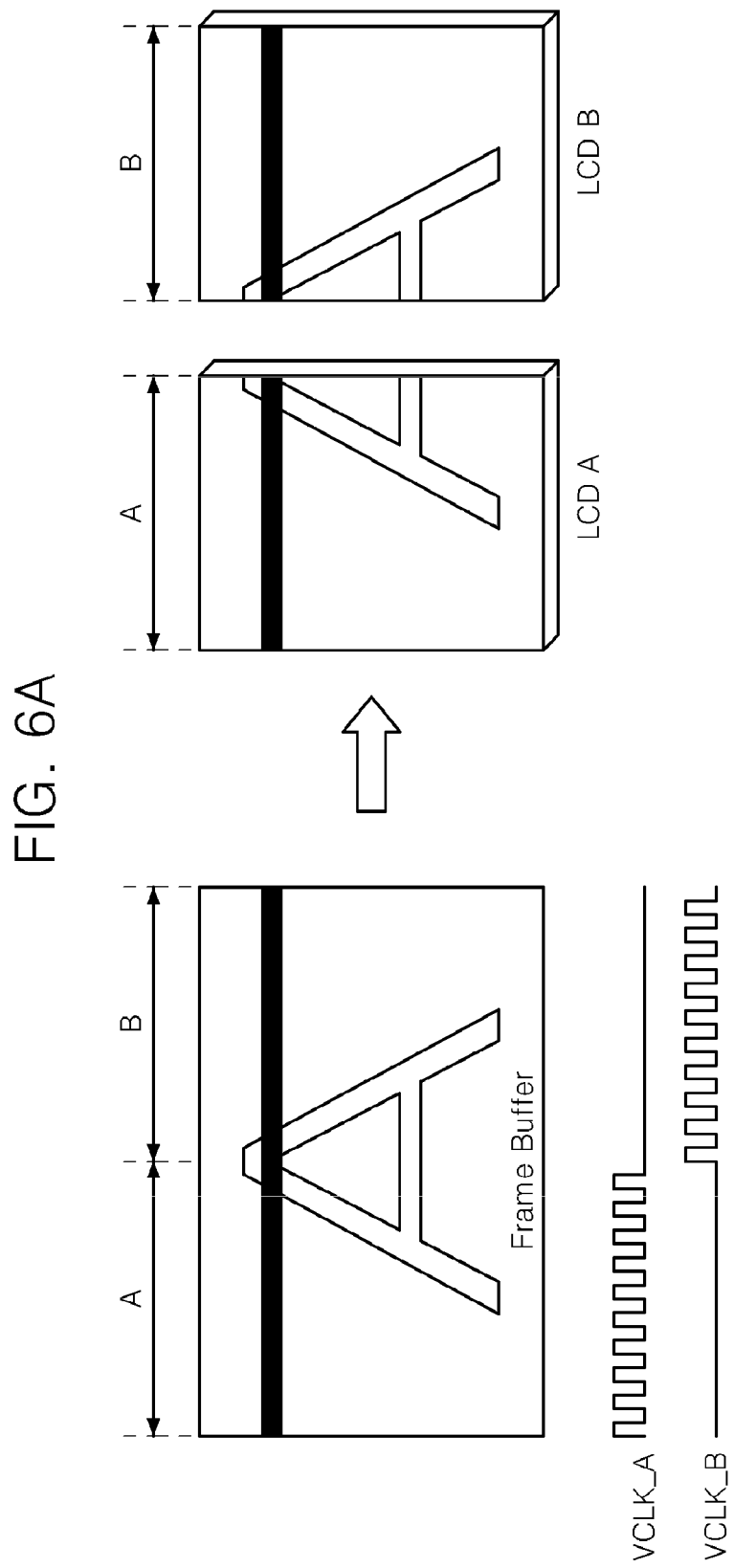
FIG. 6A illustrates an example of displaying image data on two display devices wherein each line of the image is split between two display devices.

FIG. 6A illustrates an example of a line split method of displaying image data on two display devices (e.g., the LCD devices of LCD modules 420-1 and 420-2, or LCD modules 520-1 and 520-2), wherein each line of the image is split between the two display devices, such as may be accomplished with system 400 or system 500. As shown in FIG. 6A, a frame of video data (e.g., RGB data) representing an image is stored in a frame buffer. The image is split horizontally between the two display devices (here designated "LCD A" and "LCD B"). To display the video data, a first video clock signal VLCK_A clocks the first half of each line of video data to the first (leftmost) display device (LCD A) and a second video clock signal VCLK_B clocks the second half of each line of video data to the second (rightmost) display device (LCD B).

For example, consider an example where a frame of a video signal comprises 1280 pixels in a line and 720 lines in a video frame, and the video frame is to be split equally between two display devices. In that case, LCD A and LCD B may each display 620 pixels by 720 lines for each video frame.

Of course it will be understood that in other embodiments, the image data may be split horizontally between more than two display devices.

Figure 6B:
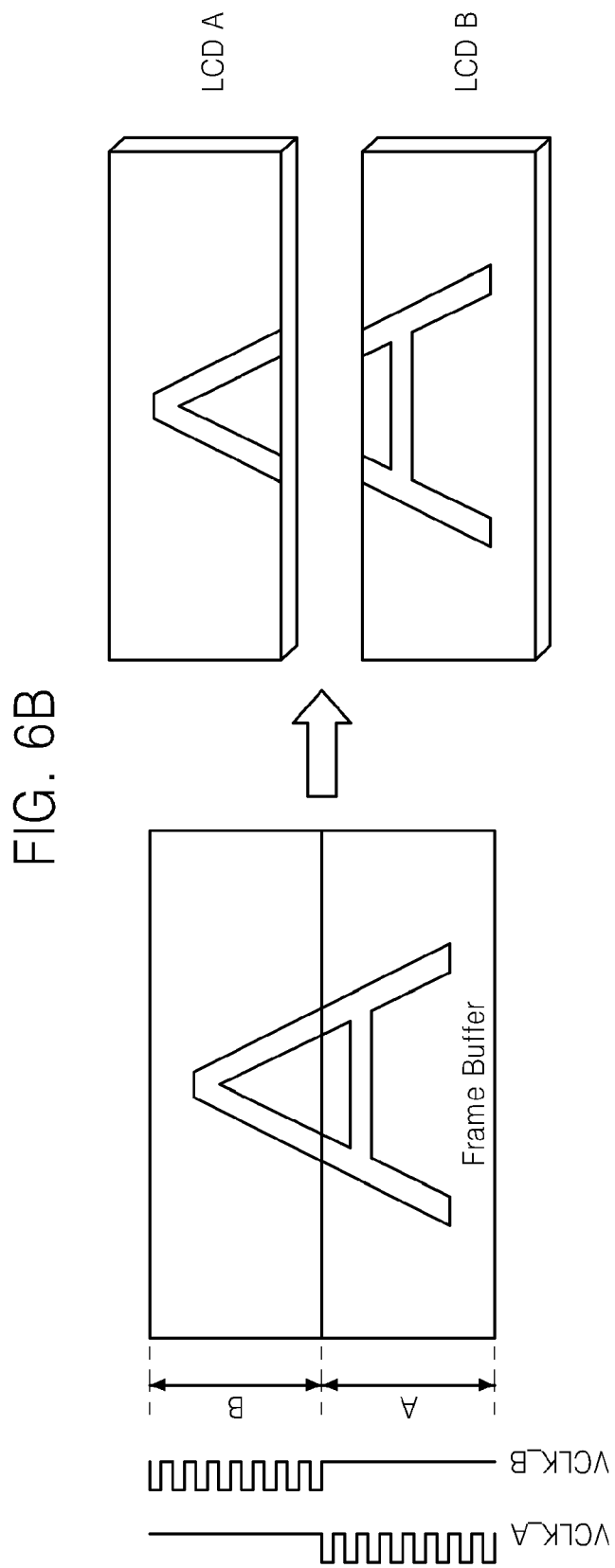
FIG. 6B illustrates an example of displaying image data on two display devices wherein each column of the image is split between two display devices.

FIG. 6B illustrates an example of a frame split method of displaying image data on two display devices (e.g., the LCD devices of LCD modules 420-1 and 420-2, or LCD modules 520-1 and 520-2), wherein each column of the image is split between the two display devices, such as may be accomplished with system 400 or system 500. As shown in FIG. 6B, a frame of video data (e.g., RGB data) representing an image is stored in a frame buffer. The image is split vertically between the two display devices or modules (here designated "LCD A" and "LCD B"). To display the video data, a first video clock signal VLCK_A clocks the first half of each frame of video data to the first (topmost) display device (LCD A) and a second video clock signal VCLK_B clocks the second half of each frame of video data to the second (bottommost) display device (LCD B).

For example, consider an example where a frame of a video signal comprises 1280 pixels in a line and 720 lines in a video frame, and the video frame is to be split equally between two display devices. In that case, LCD A and LCD B may each display 1280 pixels by 360 lines for each video frame.

Of course it will be understood that in other embodiments, the image data may be split vertically between more than two display devices.

FIG. 7 shows an example of a timing diagram for some signals employed in displaying image data (e.g., RGB data) on two display devices (e.g., LCD modules), wherein each line of the image is split between the two LCD modules, for example as illustrated in FIG. 6A.

As shown in FIG. 7, a first clock signal VCLK_A, a video data enable signal VDEN, and video data (e.g., RGB data) are provided to the first display device (e.g., first LCD module 420-1 or 520-1), together with other signals such as a vertical sync signal VSYNC and a horizontal sync signal HSYNC. Also, a second clock signal VCLK_B, the video data enable signal VDEN, and the video data (e.g., RGB data) are provided to the second display device (e.g., second LCD module 420-2 or 520-2), together with other signals not shown in FIG. 7 such as the vertical sync signal VSYNC and the horizontal sync signal HSYNC.

During the first half of each line period, the first clock signal VCLK_A clocks the video data to the first display device while the second clock signal VCLK_B is masked out (for example by video control masking unit 417 or video control masking unit 517) such that no clock pulse or transitions occur and therefore no video data is clocked to the second display device. Then during the second half of each line period, the second clock signal VCLK_B clocks the video data to the second display device while the first clock signal VCLK_A is masked out (for example by video control masking unit 417 or video control masking unit 517) such that no clock pulse or transitions occur and therefore no video data is clocked to the first display device.

In some embodiments, the RGB data may be generated by mixing image data from at least two independent images stored in memory.

FIG. 8 shows another example of a timing diagram for signals employed in displaying image data (e.g., RGB data) on two display devices (e.g., LCD modules), wherein each line of the image is split between two LCD devices, for example as illustrated in FIG. 6A.

As shown in FIG. 8, a clock signal VCLK, a first video data enable signal VDEN_A, and video data (e.g., RGB data) are provided to the first display device (e.g., first LCD module 420-1 or 520-1), together with other signals not shown in FIG. 7 such as a vertical sync signal VSYNC and a horizontal sync signal HSYNC. Also, the clock signal VCLK, a second video data enable signal VDEN_B, and the video data (e.g., RGB data) are provided to the second display device (e.g., second LCD module 420-2 or 520-2), together with other signals not shown in FIG. 8 such as the vertical sync signal VSYNC and the horizontal sync signal HSYNC.

During the first half of each the active line period HACT of each line period, the first video data enable signal VDEN_A is enabled (active "HIGH") so that the video data (e.g., RGB data) is displayed by the first display device, while the second video data enable signal VDEN_B is disabled ("LOW") (for example by video control masking unit 417 or video control masking unit 517) so that no video data is displayed by the second display device. Then during the second half of each the active line period HACT of each line period, the second video data enable signal VDEN_B is enabled (active "HIGH") so that the video data (e.g., RGB data) is displayed by the second display device, while the first video data enable signal VDE_A is disabled ("LOW") (for example by video control masking unit 417 or video control masking unit 517) so that no video data is displayed by the first display device.

In some embodiments, the RGB data may be generated by mixing image data from at least two independent images stored in memory.

Figure 9:
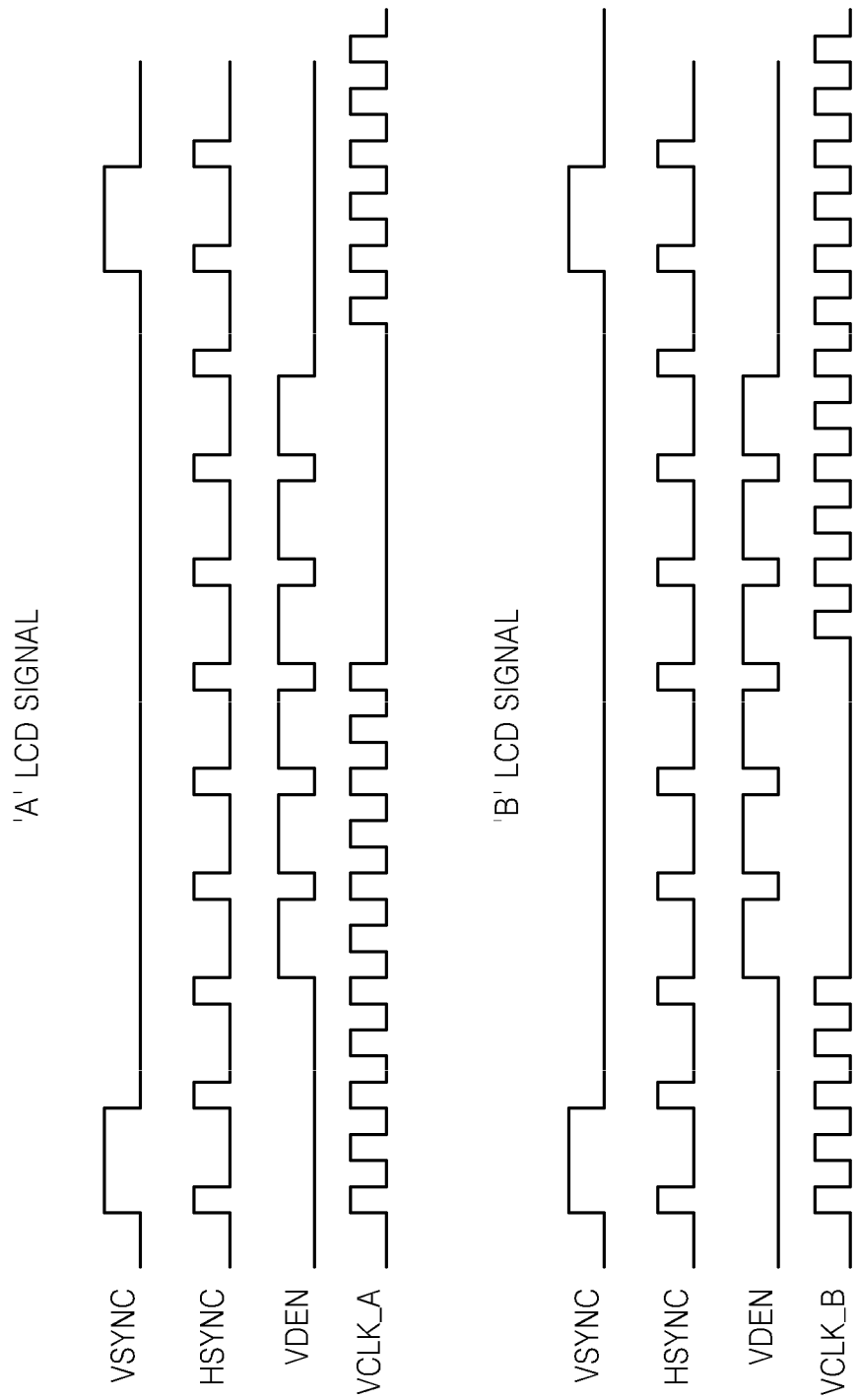
FIG. 9 shows an example of a timing diagram for signals employed in displaying image data on two display devices wherein each column of the image is split between two display devices.

FIG. 9 shows an example of a timing diagram for signals employed in displaying image data (e.g., RGB data) on two display devices (e.g., LCD modules), wherein each column of the image is split between the two LCD modules, for example as illustrated in FIG. 6B.

As shown in FIG. 9, a first clock signal VCLK_A, a video data enable signal VDEN, a vertical sync signal VSYNC, and a horizontal sync signal HSYNC, are provided to the first display device (e.g., first LCD module 420-1 or 520-1), together with video data (e.g., RGB data) not shown in FIG. 9. Also, a second clock signal VCLK_B, the video data enable signal VDEN, the vertical sync signal VSYNC, and the horizontal sync signal HSYNC are provided to the second display device (e.g., second LCD module 420-2 or 520-2), together with video data (e.g., RGB data) not shown in FIG. 9. It should be understood that for simplifying the illustration, the clock signals VCLK_A and VCLK_B are not drawn to scale in FIG. 9, as in general there would be several cycles of the clock signals within a line period between horizontal sync pulses in HSYNC.

During each line period in the first (e.g., top) half of each video frame, between consecutive vertical sync pulses in VSYNC, the first clock signal VCLK_A clocks the video data to the first display device while the second clock signal VCLK_B is masked out (for example by video control masking unit 417 or video control masking unit 517) such that no clock pulse or transitions occur and therefore no video data is clocked to the second display device. Then during the second half of each video frame, the second clock signal VCLK_B clocks out the video data to the second display device while the first clock signal VCLK_A is masked out (for example by video control masking unit 417 or video control masking unit 517) such that no clock pulse or transitions occur and therefore no video data is clocked to the first display device.

In some embodiments, the video data may be generated by mixing image data from at least two independent images stored in memory.

Figure 10:
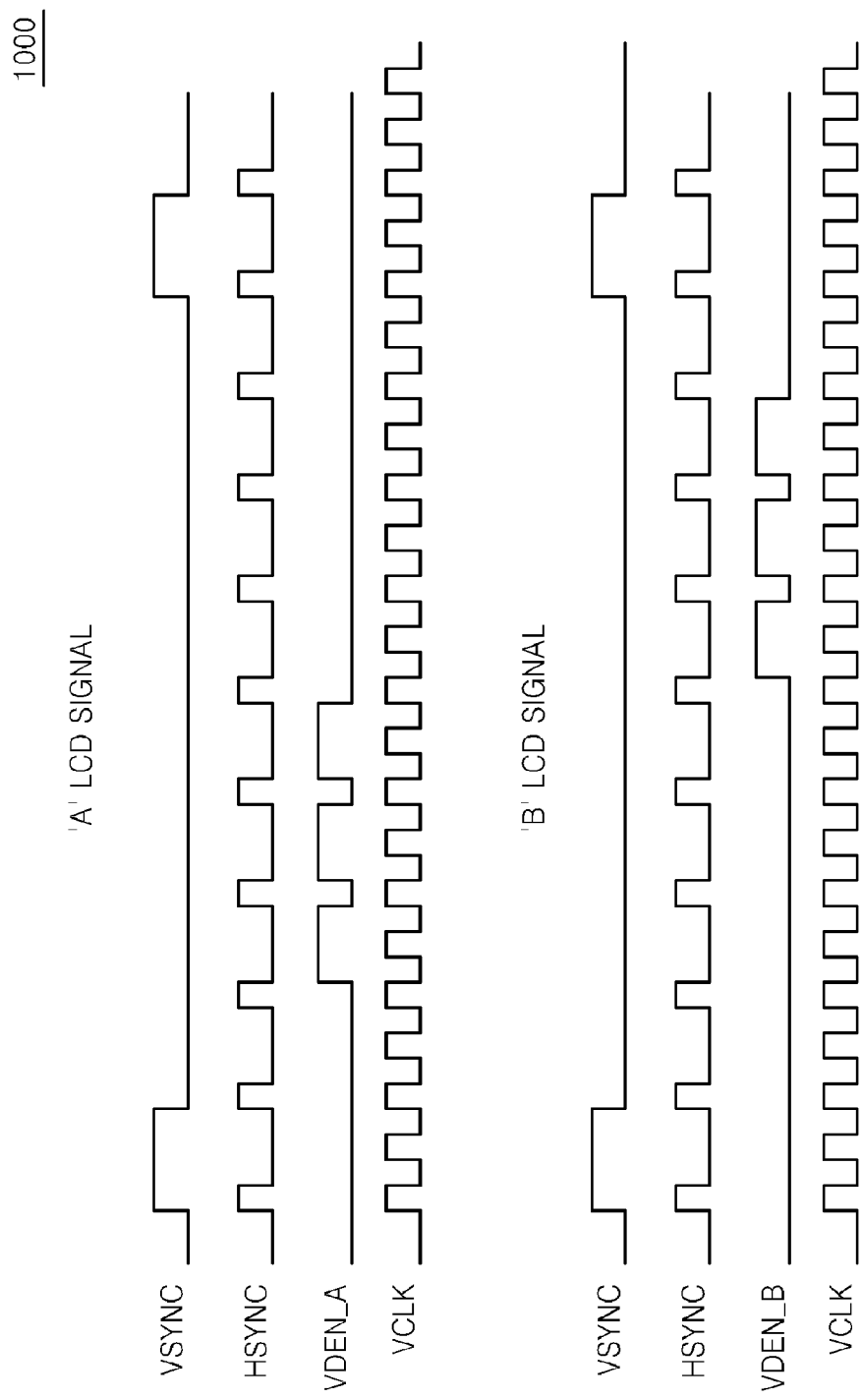
FIG. 10 shows another example of a timing diagram for signals employed in displaying image data on two display devices wherein each column of the image is split between two display devices.

FIG. 10 shows another example of a timing diagram for signals employed in displaying image data (e.g., RGB data) on two display devices (e.g., LCD modules), wherein each column of the image is split between two LCD modules, for example as illustrated in FIG. 6B.

As shown in FIG. 10, a clock signal, a first video data enable signal VDEN_A, a vertical sync signal VSYNC, and a horizontal sync signal HSYNC, are provided to the first display device (e.g., first LCD module 420-1 or 520-1), together with video data (e.g., RGB data) not shown in FIG. 10. Also, the clock signal VCLK, a second video data enable signal VDEN_B, the vertical sync signal VSYNC, and the horizontal sync signal HSYNC are provided to the second display device (e.g., second LCD module 420-2 or 520-2), together with video data (e.g., RGB data) not shown in FIG. 10. It should be understood that for simplifying the illustration, the clock signal VCLK is not drawn to scale in FIG. 10, as in general there would be several cycles of the clock signals within a line period between horizontal sync pulses in HSYNC.

During the active line period HACT of each line period in the first (e.g., top) half of each video frame, between consecutive vertical sync pulses in VSYNC, the first video data enable signal VDEN_A is enabled (active "HIGH") so that the video data (e.g., RGB data) is displayed by the first display device, while the second video data enable signal VDEN_B is disabled ("LOW") (for example by video control masking unit 417 or video control masking unit 517) so that no video data is displayed by the second display device. Then during the active line period HACT of each line period in the second (e.g., bottom) half of each video frame, the second video data enable signal VDEN_B is enabled (active "HIGH") so that the video data (e.g., RGB data) is displayed by the second display device, while the first video data enable signal VDEN_A is disabled ("LOW") (for example by video control masking unit 417 or video control masking unit 517) so that no video data is displayed by the first display device.

In some embodiments, the video data may be generated by mixing image data from at least two independent images stored in memory.

Figure 11:
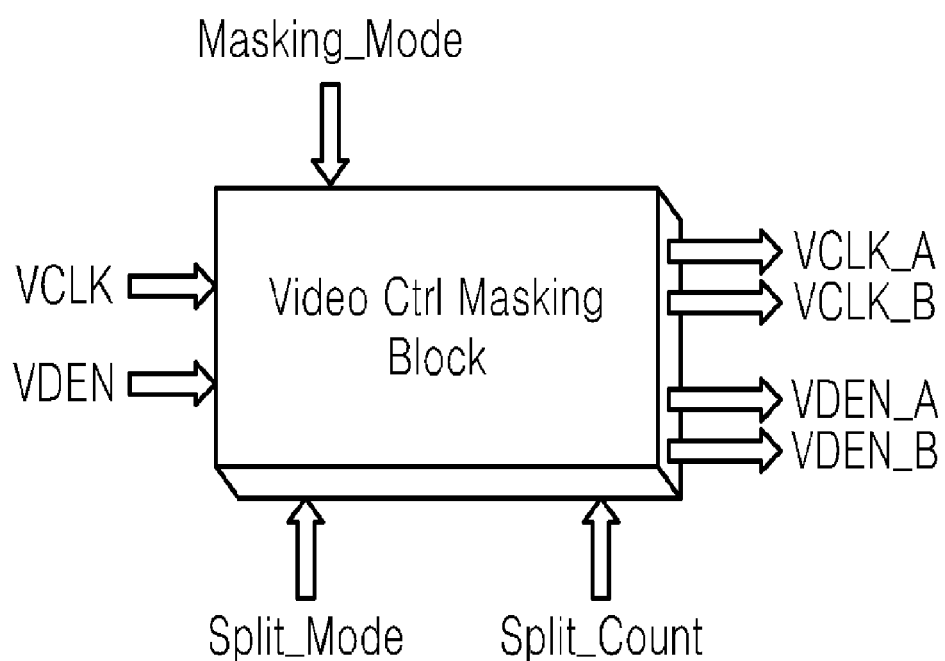
FIG. 11 illustrates one example of a video control masking block.

FIG. 11 illustrates one example of a video control masking block 1100. Video Masking Control Block 1100 may be one embodiment of video control masking unit 417 or video control masking unit 517.

Video Masking Control Block 1100 generates video clock signals VCLK and/or video data enable signals VDEN for each display unit by masking the original video clock signal VCLK or video data enable signal VDEN received from an LCD controller such as LCD controller 415 or 515. In some embodiments, Video Masking Control Block 1100 may execute signal masking operations described above with respect to FIGS. 6A-B, 7, 8, 9 and 10. In some embodiments Video Masking Control Block 1100 may be configured to mask either the video clock signal VCLK or video data enable signal VDEN, and provide the masked signals to the first and second display devices, depending upon a control signal or control input (e.g., a voltage) provided to Video Masking Control Block 1100 and/or a device (e.g., an SOC device) that includes Video Masking Control Block 1100.

A Split_Mode signal indicates whether the video data is to be split horizontally (i.e., video data for each line period of a video frame is split between two display devices) in a line split method, or is to be split vertically (i.e., video data for a first set of lines of each frame go to a first display device and video data for a second set of lines of each frame go to a second display device) in a frame split method.

A Split_Count signal indicates the demarcation point (e.g., a video line when the frame split method is employed) where the video data is to be divided between the two display devices.

A Masking_Mode signal determines whether Video Control Masking Block 1100 masks the video clock signal VCLK, or masks the video data enable signal VDEN, for each of the two display devices.

In some embodiments, logic values for the Masking_Mode signal, the Split_Mode signal, and/or the Split_Count signals may be stored in a Special Function Register (SFR) in an SOC device or an LCD Module System that includes Video Control Masking Block 1100.

Other signals of the interface for driving an LCD module, such as the video data (e.g., RGB) signals bypass Video Control Masking Block 1100 and are provided directly to the LCD modules. In some embodiments whichever of the VCLK and VDEN signals that is not being masked by Video Control Masking Block 1100 also bypasses Video Control Masking Block 1100 and is provided directly to the LCD modules.

Figure 12:
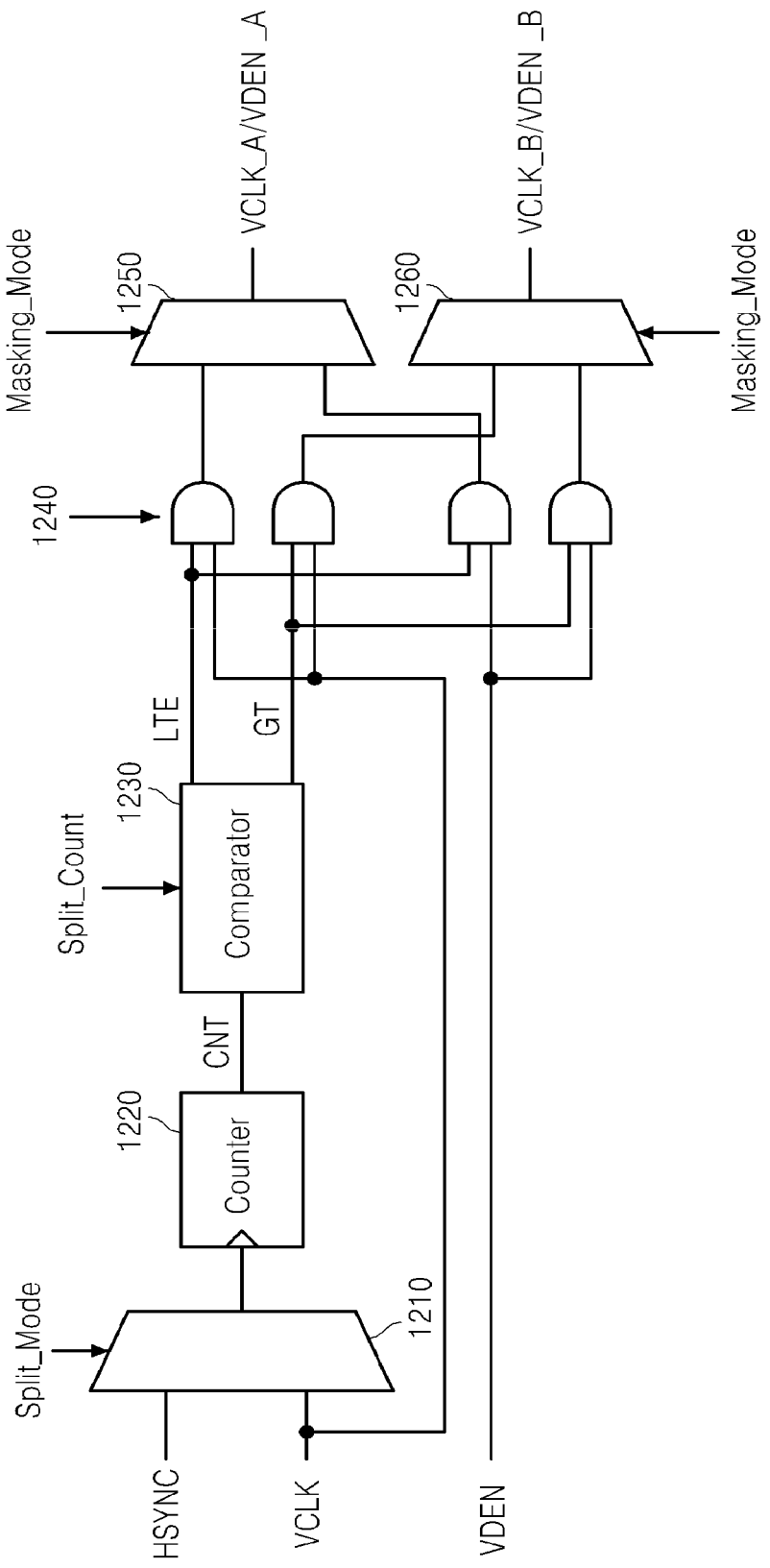
FIG. 12 shows a functional block diagram of one embodiment of a video control masking block.

FIG. 12 shows a functional block diagram of one embodiment of a video control masking block 1200 which may correspond to the Video Control Masking Block 1100 of FIG. 11 and/or video control masking unit 417 or video control masking unit 517.

Video masking control block 1200 includes multiplexer or switch 1210, counter 1220, comparator 1230, logic 1240, multiplexer or switch 1250 and multiplexer or switch 1260.

As explained in greater detail below, video masking control block 1200 generates video clock signals VCLK and/or video data enable signals VDEN for each display unit by masking the original video clock signal VCLK or video data enable signal VDEN received from an LCD controller such as LCD controller 415 or 515. In some embodiments, video masking control block 1200 may execute signal masking operations described above with respect to FIGS. 6A-B, 7, 8, 9 and 10. Video masking control block 1200 may be configured to mask either the video clock signal VCLK or video data enable signal VDEN, and provide the masked signals to the first and second display devices, depending upon a control signal or control input (e.g., a voltage) provided to video masking control block 1200 and/or a device (e.g., an SOC device) that includes video masking control block 1200.

In operation, multiplexer/switch 1210 receives the horizontal sync signal HSYNC and the video clock signal VCLK and a selection signal Split_Mode for selecting one of the signals HSYNC and VCLK. In particular, when a system that includes video masking control block 1200 executes a line split method such as that illustrated in FIG. 6A, then election signal Split_Mode causes multiplexer/switch 1210 to select VCLK, and when a system that includes video masking control block 1200 executes a frame split method such as that illustrated in FIG. 6B, then election signal Split_Mode causes multiplexer/switch 1210 to select HSYNC.

The output of multiplexer/switch 1210 clocks counter 1220. The output of counter 1220 is provided to a comparator 1230 which compares the counter output to a Split_Count value that indicates the demarcation point where the video data is to be divided between the two display devices. For example, consider an example where a frame of a video signal comprises 1280 pixels in a line and 720 lines in a video frame, and where the video frame is to be split equally between two display devices. In that case, in a line split mode the Split_Count value may be about 640, accounting for however many clock periods are included in a horizontal sync period HS and/or a back porch horizontal blanking period HB. In contrast, in a frame split mode the Split_Count value may be about 360, accounting for however many horizontal sync periods are included in a vertical sync period VS and/or a back porch period VB.

In response to the output of counter 1220 and the Split-Count signal, comparator 1230 outputs a less-than-or-equal-to (LTE) signal with logic true or HIGH when the count from counter 1220 is less-than-or-equal-to the Split-Count value, and a logic false or LOW when the count from counter 1220 is not less-than-or-equal-to the Split-Count value. In response to the output of counter 1220 and the Split-Count signal, comparator 1230 also outputs a greater than (GT) signal with logic true or HIGH when the count from counter 1220 is greater than the Split-Count value, and a logic false or LOW when the count from counter 1220 is not greater than the Split-Count value.

Logic 1240 uses the GTE and LT signals output from comparator 1230 to gate the video clock signal VCLK and the video data enable signal VDEN, and provides the masked signals to multiplexer/switch 1250 and multiplexer/switch 1260.

Multiplexer/switch 1250 receives masked VCLK signal VCLK_A and masked video data enable signal VDEN_A from logic 1240, and the Masking_Mode signal. Multiplexer/switch 1260 receives masked VCLK signal VCLK_B and masked video data enable signal VDEN_B from logic 1240, and the Masking_Mode signal. When the Masking_Mode signal indicates that the video clock signal should be masked, for example as shown in FIGS. 7 and 9, then multiplexer/switch 1250 outputs VCLK_A and multiplexer/switch 1260 outputs VCLK_B. On the other hand, when Masking_Mode signal indicates that the video data enable signal should be masked, for example as shown in FIGS. 8 and 10, then multiplexer/switch 1250 outputs VDEN_A and multiplexer/switch 1260 outputs VDEN_B.

Figure 13:
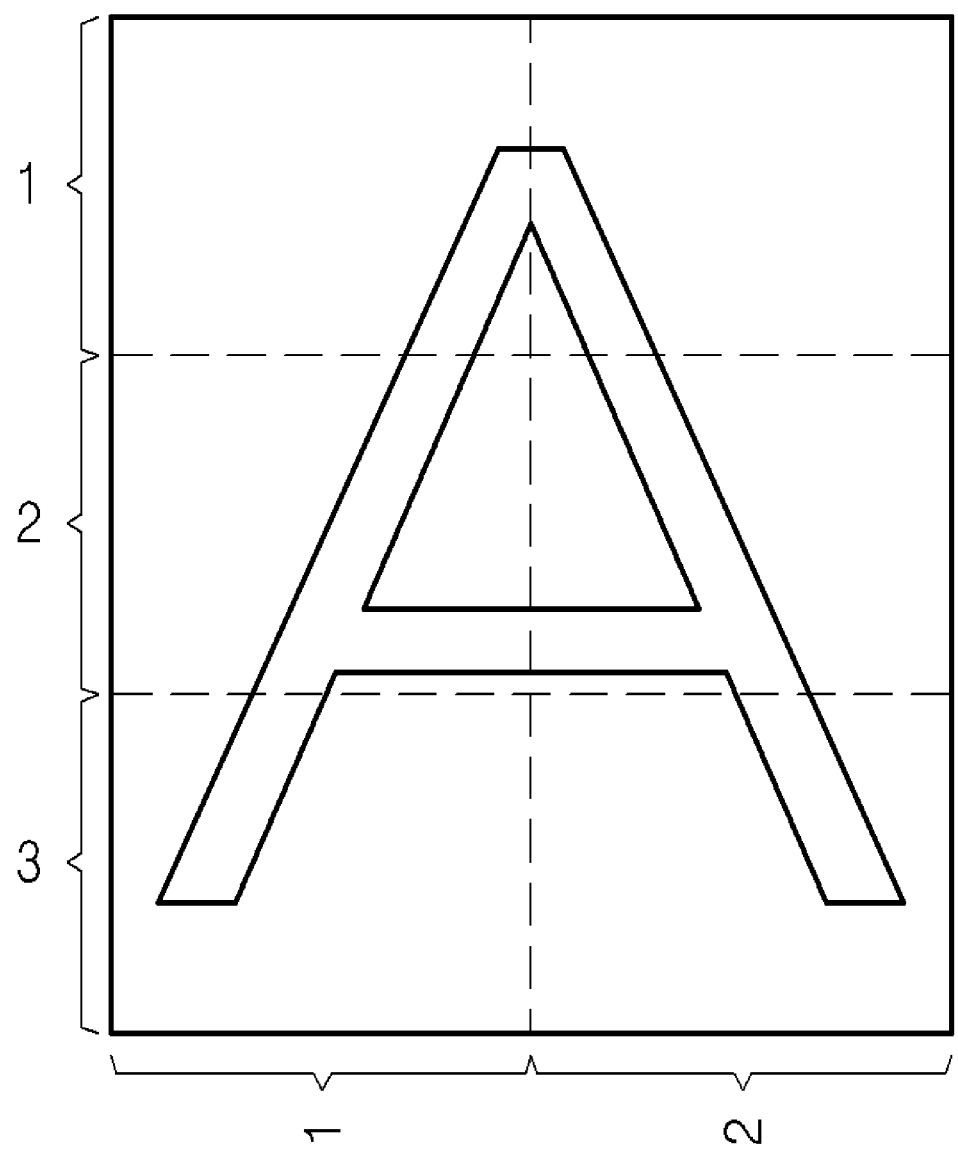
FIG. 13 illustrates displaying a single image via the combination of a plurality of display devices.

FIG. 13 illustrates displaying a single image via the combination of a plurality of display devices (e.g., LCD modules). In particular, FIG. 13 illustrates splitting image data representing a single image so as to display the image via a combination of six display devices or modules arranged in three columns by two rows.

In general, the methods, devices, and systems described above can be extended to a display system having M×N display devices or modules. In some embodiments, this requires more Split_Count signals for a video masking control block according to the number of display units employed. In some of these embodiments, the Split_Mode signal is no longer utilized.

Figure 14:
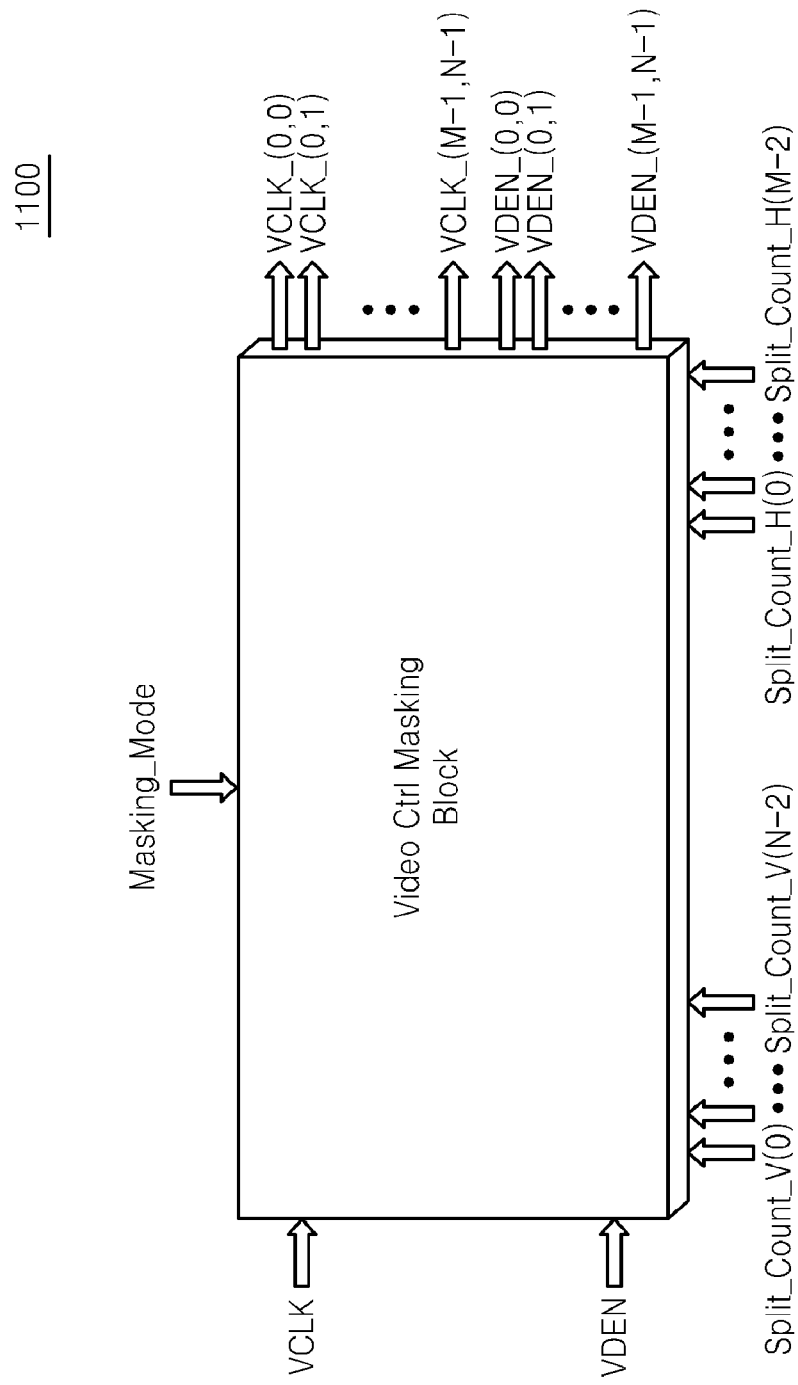
FIG. 14 illustrates another example of a video control masking block.

FIG. 14 illustrates an example of a video control masking block 1400 that can be employed in the SOC (see FIG. 4) or in an LCD Module System (see FIG. 5) of a display system having M×N display devices or modules. Here there are (M−1)×(N−1) Split_Count signals provided to video control masking block 1400, and video control masking block 1400 outputs M×N VCLK/VDEN signals.

While preferred embodiments are disclosed herein, many variations are possible which remain within the concept and scope of the claims. Such variations would become clear to one of ordinary skill in the art after inspection of the specification, drawings and claims herein. The claims therefore are not to be restricted except within the spirit and scope of the appended claims.

What is claimed is:

1. A method of driving a plurality of liquid crystal display (LCD) modules each including an LCD device, the method comprising:
receiving a video clock signal that clocks a stream of RGB data provided in common to the plurality of LCD modules, wherein the RGB data comprises a plurality of video frames, each video frame further comprising a plurality of video lines;
receiving one or more control signals indicating that each video line is to be divided among the plurality of LCD modules, such that each LCD module displays only RGB data for a corresponding portion of each video line;
masking the video clock signal to generate a plurality of masked clock signals, each masked clock signal corresponding to one of the plurality of LCD modules and including a plurality of clock transitions corresponding to the RGB data for the corresponding portion of each video line to be displayed by the corresponding one of the LCD modules; and
providing each of the masked signals to the corresponding one of the plurality of LCD modules.

2. The method of claim 1, further comprising:
generating the stream of RGB data by mixing image data from at least two independent images stored in a system memory.

3. The method of claim 2, further comprising:
receiving the image data stored in the system memory via multiple direct memory access ports.

4. The method of claim 1, further comprising:
receiving a masking mode signal as one of the one or more control signal; and
masking the video clock signal in response to the masking mode signal.

5. A method of driving a plurality of liquid crystal display (LCD) modules each including an LCD device, the method comprising:
receiving a video clock signal that clocks a stream of RGB data provided in common to the plurality of LCD modules, wherein the RGB data comprises a plurality of video frames, each video frame further comprising a plurality of video lines;
receiving one or more control signals indicating that each video frame is to be divided among the plurality of LCD modules, such that each LCD module displays only RGB data for a corresponding portion of each video frame;
masking the video clock signal to generate a plurality of masked clock signals, each masked clock signal corresponding to one of the plurality of LCD modules and including a plurality of clock transitions corresponding to the RGB data for the corresponding portion of each video frame to be displayed by the corresponding one of the LCD modules; and
providing each of the masked signals to the corresponding one of the plurality of LCD modules.

6. A system, comprising:
a display controller configured to output a stream of video data that is provided in common to a plurality of display modules, each display module including a display device, and the video data including RGB data being arranged in a plurality of video frames, each video frame further including a plurality of video lines; and
a video control masking unit, receiving a video clock signal that clocks the RGB data, and one or more control signals that indicate that each video line is to be divided among the plurality of LCD modules, such that each LCD module displays only RGB data for a corresponding portion of each video line,
wherein the video control masking unit is configured to mask the video clock signal to generate a plurality of masked clock signals, each masked clock signal corresponding to one of the plurality of LCD modules and including a plurality of clock transitions corresponding to the RGB data for the corresponding portion of each video line to be displayed by the corresponding one of the LCD modules.

7. The system of claim 6, wherein the video control masking unit comprises:
a counter configured to count cycles of the video clock signal and output a corresponding count value;
a comparator configured to compare the count value to a split count value indicating a split demarcation point for each video line and output a split count signal; and
logic that masks the video clock signal in response to the split count signal.

8. The system of claim 6, further comprising:
a system memory that provides image data to the display controller, wherein the display controller generates the stream of video data from the image data, and
the display controller is disposed on a system-on-chip (SOC) provided between the system memory and the plurality of display modules.

9. The system of claim 8, wherein the image data includes at least two independent images stored in system memory, and
the SOC comprises at least two direct memory access ports respectively receiving one of the at least two independent images.

10. The system of claim 8, wherein the video control masking unit is disposed on the SOC.

11. The system of claim 8, wherein the video control masking unit is disposed on a display module system with the plurality of display modules, the display module system being externally disposed to the SOC and the system memory.

12. A system, comprising:
a display controller configured to output a stream of video data that is provided in common to a plurality of display modules, each display module including a display device, and the video data including RGB data being arranged in a plurality of video frames, each video frame further including a plurality of video lines; and a video control masking unit, receiving a video clock signal that clocks the RGB data, and one or more control signals that indicate that each video frame is to be divided among the plurality of LCD modules, such that each LCD module displays only RGB data for a corresponding portion of each video frame, wherein the video control masking unit is configured to mask the video clock signal to generate a plurality of masked clock signals, each masked clock signal corresponding to one of the plurality of LCD modules and including a plurality of clock transitions corresponding to the RGB data for the corresponding portion of each video frame to be displayed by the corresponding one of the LCD modules.

13. The system of claim 12, wherein the video control masking unit comprises:

a counter configured to count cycles of the video clock signal and output a corresponding count value;

a comparator configured to compare the count value to a split count value indicating a split demarcation point for each video line and output a split count signal; and logic that masks the video clock signal in response to the split count signal.

14. The system of claim 12, further comprising:

a system memory that provides image data to the display controller, wherein the display controller generates the stream of video data from the image data, and the display controller is disposed on a system-on-chip (SOC) provided between the system memory and the plurality of display modules.

15. The system of claim 14, wherein the image data includes at least two independent images stored in system memory, and the SOC comprises at least two direct memory access ports respectively receiving one of the at least two independent images.

16. The system of claim 14, wherein the video control masking unit is disposed on the SOC.

17. The system of claim 14, wherein the video control masking unit is disposed on a display module system with the plurality of display modules, the display module system being externally disposed to the SOC and the system memory.

* * * * *